(12) United States Patent
Zaccardi et al.

(10) Patent No.: US 10,669,872 B2
(45) Date of Patent: Jun. 2, 2020

(54) INTERMEDIATE CASE FOR AN AIRCRAFT TURBOMACHINE COMPRISING A LUBRICANT PASSAGE END-PIECE CONNECTED TO A CASE VANE BY A CONNECTION PIECE

(71) Applicant: SAFRAN AIRCRAFT ENGINES, Paris (FR)

(72) Inventors: Cédric Zaccardi, Saint Maur des Fosses (FR); Laurent Jablonski, Rubelles (FR); Christophe Paul Jacquemard, Hericy (FR); Christophe Marcel Lucien Perdrigeon, Ballainvilliers (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 182 days.

(21) Appl. No.: 15/936,657

(22) Filed: Mar. 27, 2018

(65) Prior Publication Data

US 2018/0306042 A1 Oct. 25, 2018

(30) Foreign Application Priority Data

Mar. 31, 2017 (FR) .................................... 17 52791

(51) Int. Cl.
*F01D 9/06* (2006.01)
*F01D 25/18* (2006.01)
(Continued)

(52) U.S. Cl.
CPC ............. *F01D 9/065* (2013.01); *F01D 5/185* (2013.01); *F01D 9/042* (2013.01); *F01D 25/12* (2013.01);
(Continued)

(58) Field of Classification Search
CPC .......... F01D 9/065; F01D 5/185; F01D 9/042; F01D 25/125; F01D 25/18
See application file for complete search history.

(56) References Cited

U.S. PATENT DOCUMENTS 8,616,834 B2* 12/2013 Knight, III ................ F01D 5/18
415/116
2017/0159489 A1* 6/2017 Sennoun ............... F01D 25/125
(Continued)

FOREIGN PATENT DOCUMENTS

FR 2 989 110 A1 10/2013
FR 3 028 575 A1 5/2016

OTHER PUBLICATIONS

Search Report issued in French Patent Application No. 1751452 dated Dec. 11, 2017.
(Continued)

*Primary Examiner* — J. Todd Newton
*Assistant Examiner* — Sabbir Hasan
(74) *Attorney, Agent, or Firm* — Pearne & Gordon LLP

(57) ABSTRACT

The invention relates to an intermediate case for a twin spool turbomachine for an aircraft, comprising at least one lubricant passage and piece (88a) associated with at least one of its vanes (24), comprising a lubricant passage (98a) extending along a passage axis (134a) and opening up into the lubricant duct (55a). The passage axis (134a) and the orifice axis (140a) are also at a spacing from each other along a circumferential direction (91), and a connection piece (125a) through which a connection conduit (142a) passes is firstly partially housed in the vane root (34) so as to create a communication between the connection duct (142a) and the lubricant passage orifice (124a), and secondly is partially housed in an end-piece support device (108a) or in the lubricant passage end-piece (88a), such that the connection (Continued)

conduit (142a) communicates with the lubricant passage (98a) in the end-piece.

11 Claims, 7 Drawing Sheets

(51) Int. Cl.
    *F04D 29/54*     (2006.01)
    *F02C 7/18*     (2006.01)
    *F04D 29/58*     (2006.01)
    *F02K 3/115*     (2006.01)
    *F04D 29/063*     (2006.01)
    *F01D 5/18*     (2006.01)
    *F01D 9/04*     (2006.01)
    *F01D 25/12*     (2006.01)
    *F02K 3/06*     (2006.01)
(52) U.S. Cl.
    CPC ................ *F01D 25/18* (2013.01); *F02C 7/18* (2013.01); *F02K 3/06* (2013.01); *F02K 3/115* (2013.01); *F04D 29/063* (2013.01); *F04D 29/542* (2013.01); *F04D 29/584* (2013.01); *F05D 2220/32* (2013.01); *F05D 2240/12* (2013.01); *F05D 2240/14* (2013.01); *F05D 2260/213* (2013.01); *F05D 2260/98* (2013.01); *Y02T 50/671* (2013.01); *Y02T 50/676* (2013.01)

(56) References Cited

U.S. PATENT DOCUMENTS

2017/0184024 A1*   6/2017   Sennoun ................ F01D 9/041
2018/0023406 A1    1/2018   Zaccardi et al.
2018/0066581 A1    3/2018   Zaccardi et al.

OTHER PUBLICATIONS

Application document as-filed for patent application entitled: Blisk Comprising a Hub Having a Recessed Face on Which a Filling Member Is Mounted, U.S. Appl. No. 15/554,936, filed Aug. 31, 2017.

* cited by examiner

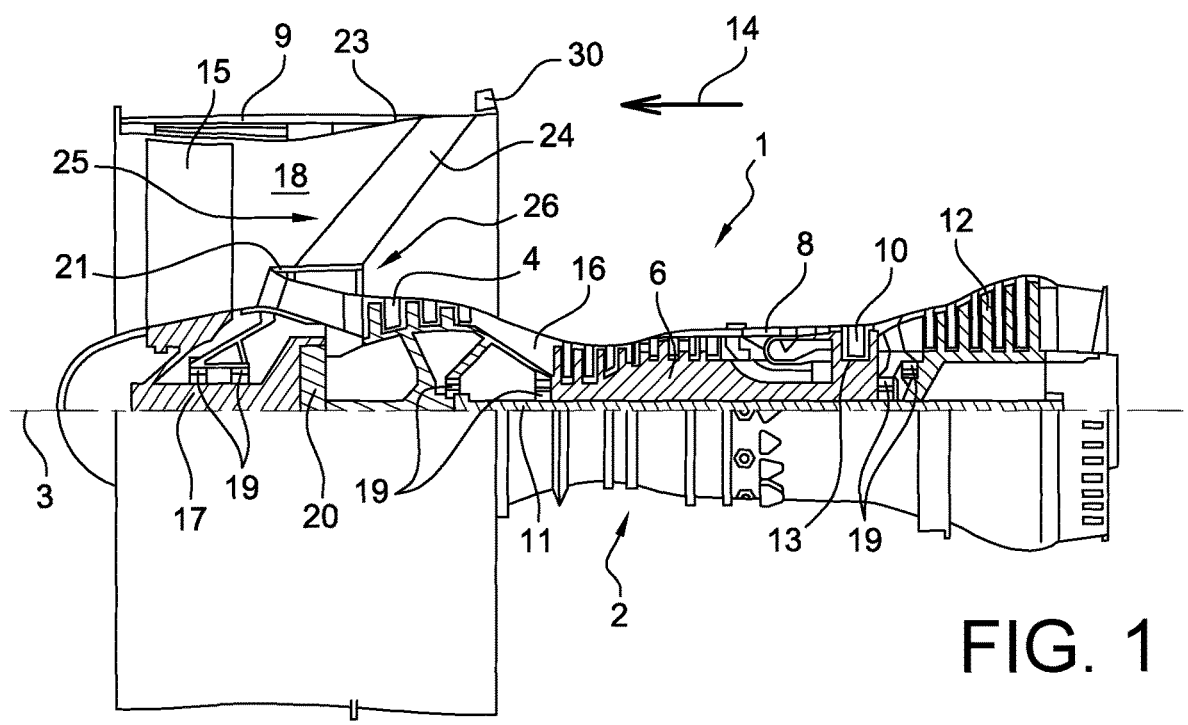

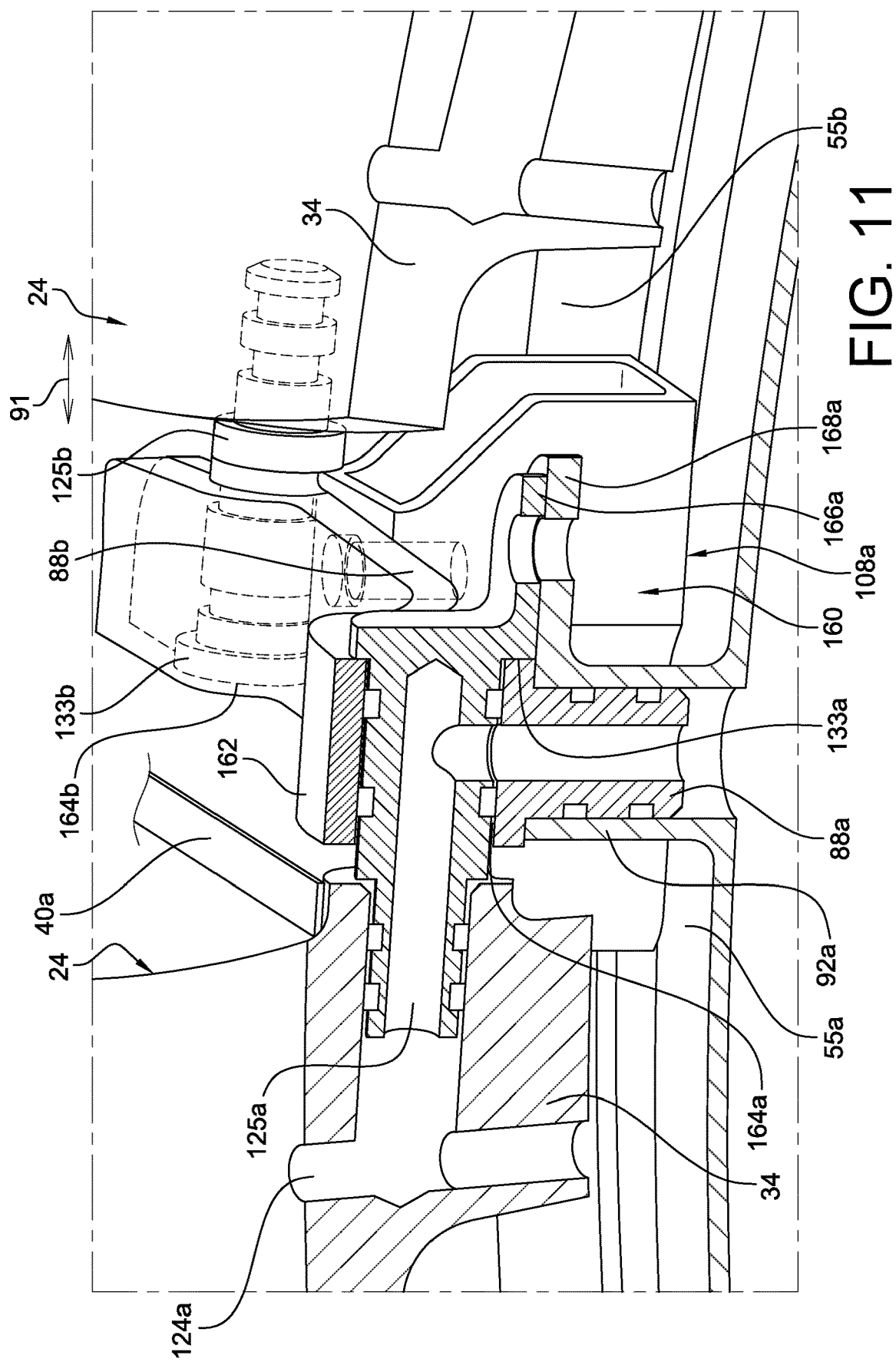

INTERMEDIATE CASE FOR AN AIRCRAFT TURBOMACHINE COMPRISING A LUBRICANT PASSAGE END-PIECE CONNECTED TO A CASE VANE BY A CONNECTION PIECE

TECHNICAL DOMAIN

This invention relates to the field of twin-spool turbomachines for aircraft, and particularly the design of the intermediate case integrating outlet guide vanes formed in the fan air stream of the turbomachine. Such "Outlet Guide Vanes" (OGV) are designed to straighten the air flow at the outlet from the fan.

STATE OF PRIOR ART

On some twin-spool turbomachines, it is known that outlet guide vanes can be installed downstream from the fan to straighten the outlet flow from the fan, and possibly also to perform a structural function. This structural function is intended to transfer forces from the centre of the turbomachine to an outer shell located along the prolongation of the fan case. In this case, an engine attachment is conventionally formed on or close to this outer shell, to form the attachment between the turbomachine and an aircraft attachment pylon.

It was also recently disclosed that the outlet guide vanes can be expected to perform an additional function. This is a heat exchange function between the outside air passing through the ring of outlet guide vanes, and lubricant circulating inside these vanes. This heat exchange function is for example known as disclosed in document U.S. Pat. No. 8,616,834, or document FR 2 989 110.

Lubricant to be cooled by the outlet guide vanes can originate from different zones of the turbomachine. It can be a lubricant circulating through lubrication chambers of roller bearings supporting engine shafts and/or the fan hub, or a lubricant used for lubrication of mechanical transmission elements of the Accessory Gear Box (AGB). Finally, it can also be used for lubrication of a fan drive reduction gearbox, when such a reduction gearbox is provided on the turbomachine to reduce the rotation speed of its fan.

Increasing lubricant needs require that the heat dissipation capacity associated with exchangers designed for cooling the lubricant should be adapted accordingly. The fact that a role of heat exchanger is assigned to the outlet guide vanes, as in the solutions in the two documents mentioned above, can in particular reduce or even eliminate conventional Air Cooled Oil Cooler (ACOC) type exchangers. Since these ACOC exchangers are generally formed in the fan flow path, reducing or eliminating them can limit disturbances in the fan flow and thus increase the global efficiency of the turbomachine. Furthermore, the reduction/elimination of ACOC exchangers contributes to reducing the engine mass.

The fact that a heat exchanger function is associated with at least some of these vanes means that lubricant inlet and/or outlet means cooperating with the vane have to be provided, particularly in the hub of the intermediate case. However, this environment is already highly congested by the presence of other auxiliaries, and the installation of lubricant ducts and their fluid connections to the vanes is difficult. This problem is particularly severe when the outlet guide vanes are connected close to the flow splitter, in a narrow zone in which the space available in the hub is very limited. Thus, there is a need to optimise intermediate cases integrating such a function, particularly so as to reduce the size of fluid connections, while facilitating fabrication, assembly and disassembly of the case, and maintenance operations.

SUMMARY OF THE INVENTION

The first purpose of the invention to at least partly satisfy this need is an intermediate case for a twin spool turbomachine for an aircraft, comprising a hub, an outer shell and outlet guide vanes installed at their ends on the hub and on the outer shell, and each of at least some of said outlet guide vanes performing a heat exchanger function and comprising a lubricant passage designed to be cooled by the fan flow following an outer surface of the outlet guide vane, a root of the outlet guide vane comprising at least one lubricant passage orifice extending along an orifice axis ($140a$, $140b$) and communicating with a lubricant duct fixed to the hub.

According to the invention, the intermediate case also comprises at least one lubricant passage end-piece associated with at least one of the outlet guide vanes, comprising a lubricant passage extending along a passage axis and opening up in the lubricant duct, the passage axis and the orifice axis being at a spacing from each other along a circumferential direction of the case. Furthermore, a connection piece through which a connection conduit passes is firstly partially housed in the vane root so as to create a communication between the connection conduit and the vane root lubricant passage orifice, and secondly is partially housed in an end-piece support device or in the lubricant passage end-piece, such that the connection conduit communicates with the lubricant passage in the end-piece.

The invention is remarkable firstly in that it can reduce the size of the case in the radial direction due to the circumferential offset between the end-piece and the vane root lubricant passage orifice. The layout advantageously becomes easier, even close to the flow splitter.

The invention also provides an ingenious solution to the search for optimisation mentioned above. Apart from being easy to fabricate for example by machining, the connection piece forms an intermediate connection part between the vane root and the duct supported by the hub, thus providing flexibility in the assembly. The position of the connection part relative to the vane and the hub can be adjusted to a certain extent, such that this connection part is optimally placed relative to these two elements. The flexibility provided by this arrangement not only facilitates assembly and disassembly, but it also limits static indeterminacy in assembly of the vane. This is particularly advantageous when the vane performs an additional structural function of transferring forces towards an engine-to-aircraft attachment. In this case, the forces then pass mainly through the vane-to-hub attachments, and not through the lubricant passage end-pieces.

With the proposed design, the vane can also be easily assembled and disassembled, and maintenance of each end-piece is also facilitated if the end-piece is damaged.

The invention also has at least one of the following optional characteristics, taken in isolation or in combination.

Said connection part is in a generally elongated shape, oriented generally along the circumferential direction of the case. For example, it can be a connection part in the form of a pin.

Preferably, said connection piece has a ball-joint connection with said vane root and/or with the end-piece support device and/or with the end-piece. Alternatively, a cylinder-cylinder type connection can be used, namely a sliding pivot type connection. In this case, the seal between these two elements can be compressed to enable a small swivel movement, and consequently compensation of the gap.

Preferably, said connection part is fixed to the vane root or onto the hub of the intermediate case, or onto the lubrication duct, and preferably onto a lug of a complementary end-piece provided on the lubricant duct, the complementary end-piece cooperating with the lubricant passage end-piece.

Preferably, the passage axis and the orifice axis are approximately parallel to each other, and are orthogonal to a conduit axis of said connection conduit.

Preferably, the end-piece support device comprises a main body fixed on the lubricant duct and a cover fixed on the main body, and the connection piece is housed in a housing formed jointly by the main body and the cover.

The main body and the end-piece may for example be formed as a single piece, or may be fixed to each other by a welded or screwed connection. For easy maintenance reasons, the connection made is preferably removable.

Preferably, the case comprises at least one bypass flow path reformation platform associated with said vane, said platform being fixed to the hub and arranged along a radially outwards direction from the vane root and the end-piece support device.

Preferably, the end-piece support device is arranged between two directly consecutive vanes of said case, this end-piece support device comprising a first and a second lubricant passage, the two end-pieces:
  being associated with two directly consecutive vanes through a first and a second connection piece respectively; and
  cooperating with a first and a second lubricant duct respectively, these ducts preferably being assigned to distribution and collection of lubricant, respectively.

In this case, integration is further improved because of the layout of the end-piece support device between two vanes, along the circumferential direction of the case.

Another purpose of the invention is a method of assembly of an intermediate case as described above, including the following steps:
  assembly of the main body of the end-piece support device on the duct(s), such that each end-piece cooperates with its associated duct;
  placement of each connection part on the main body and in the vane root, then attachment of this connection part onto its associated duct; and
  attachment of the cover on the main body so as to squeeze each connection piece between the main body and the cover of the end-piece support device.

Finally, the purpose of the invention is a twin spool turbomachine for an aircraft comprising such an intermediate case, located downstream from a fan of this turbomachine.

Other advantages and characteristics of the invention will become clear after reading the following non-limitative detailed description.

BRIEF DESCRIPTION OF THE DRAWINGS

This description will be made with reference to the appended drawings among which;

FIG. 1 diagrammatically represents a side view of a turbojet according to the invention;

FIG. 2 represents a more detailed enlarged view of a part of the fan and the intermediate case shown on the previous figure, according to one preferred embodiment of the invention;

FIG. 11 is a view similar to that in FIG. 3a, according to yet another alternative embodiment.

DETAILED DESCRIPTION OF PREFERRED EMBODIMENTS

Figure 3:
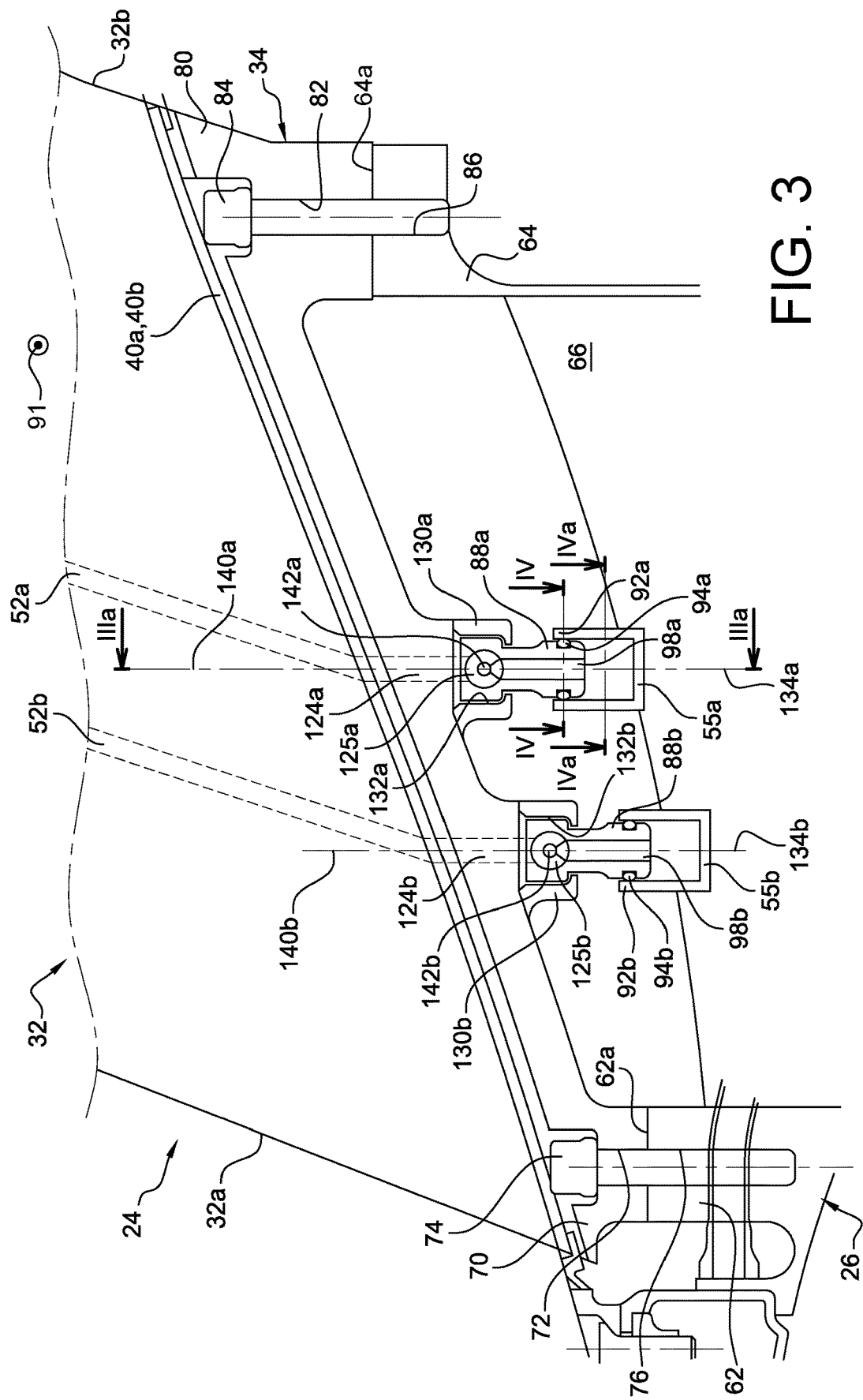
FIG. 3 represents an even more detailed enlarged view of a part of the intermediate case shown on the previous figure.

With reference to FIG. 1, the figure represents a twin-flow twin-spool turbojet, for example with a high dilution ratio. The turbojet 1 conventionally comprises a gas generator 2 with a low pressure compressor 4 on one side and a low pressure turbine 12 on the other side, this gas generator 2 comprising a high pressure compressor 6, a combustion chamber 8 and a high pressure turbine 10. In the following, the terms "forward" and aft" are considered along a direction 14 opposite to the main flow direction of gases in the turbojet, this direction 14 being parallel to the longitudinal axis 3 of the turbojet. On the other hand, the terms "upstream" and "downstream" are considered along the main flow direction of gases within the turbojet.

The low pressure compressor 4 and the low pressure turbine 12 form a low pressure case, and are connected to each other through a low pressure shaft 11 centred on the axis 3. Similarly, the high pressure compressor 6 and the high pressure turbine 10 form a high pressure case, and are connected to each other through a high pressure shaft 13 centred on the axis 3 and arranged around the low pressure shaft 11. The shafts are supported by bearing blocks 19 that are lubricated by being located in oil chambers. The same applies for the fan hub 17, also supported by roller bearings 19.

The turbojet 1 also comprises a single fan 15 located forward from the gas generator 2 and the low pressure compressor 4, that in this case is located directed aft from the engine nose dome. The fan 15 rotates about the axis 3, and is surrounded by a fan case 9. On FIG. 1, it is not driven by the low pressure shaft 11 directly, but is only driven by this shaft indirectly through a reduction gear 20, so that it can rotate at a lower speed. Nevertheless, a direct drive solution for the fan 15, by the low pressure shaft 11, is within the scope of the invention.

Furthermore, the turbojet 1 defines a core path 16 through which a core flow will pass, and a fan path 18 through which a fan flow will pass and that is radially outside the core flow, therefore the fan flow being separated at a flow splitter 21.

As is well known to an expert in the subject, the fan flow path 18 is delimited radially externally partly by an outer shell 23, preferably metallic, prolonging the fan case 9 in the aft direction. As will be described below, this is the outer shell 23 of an intermediate case 25 downstream from the flow splitter 21.

Although not shown, the turbojet 1 is equipped with a set of equipment, for example such as a fuel pump, a hydraulic pump, alternator, starter, variable stator vane (VSV), discharge valve actuator, or electrical power generator. In particular, there is equipment for lubrication of the reduction gear 20. This equipment is driven by an accessories gear box (AGB) (not shown) that is also lubricated.

There is a ring of outlet guide vanes (OGV) 24 in the fan flow 18, downstream from the fan 15. These stator vanes 24 connect the outer shell 23 to a hub 26 of the intermediate case that is thus composed of the outer shell 23, the outlet guide vanes 24 and the hub 26 located in the downstream prolongation of the flow splitter 21.

The vanes 24 are circumferentially spaced from each other to straighten the fan flow after it has passed through the fan 15. Furthermore, these vanes 24 can also perform a structural function, as is the case in the example embodiments described herein. They transfer forces from the reduction gear and roller bearings 19 of the engine shafts and the fan hub, to the outer shell 23. These forces can then transit through an engine attachment 30 fixed onto the shell 23 connecting the turbojet to an attachment pylon (not shown) of the aircraft.

Finally, in the example embodiments described herein, the outlet guide vanes 24 perform a third heat exchanger function between the bypass air flow passing through the ring of vanes, and the lubricant circulating inside these vanes 24. The lubricant that will be cooled by the outlet guide vanes 24 is the lubricant that lubricates the roller bearings 19, and/or the turbojet equipment, and/or the accessories gearbox, and/or the reduction gear 20. These vanes 24 thus form part of the fluid circuit(s) in which lubricant is circulated to lubricate the associated element(s) successively, and then to be cooled.

This function is shown schematically on FIG. 2 that only shows one of the vanes 24, but it must be understood that the invention as it will be described below can apply to all the vanes 24 in the stator ring centred on the axis 3, or only to some of these vanes.

The vane 24 may be oriented precisely along the radial direction, or preferably it can be inclined in the axial direction as shown on FIG. 2. In all cases, it is preferably straight when viewed from the side as shown on FIG. 2, and extends along a direction of the length 27.

The outlet guide vane 24 comprises an aerodynamic part 32 that corresponds to its central part, in other words the part exposed to the fan flow. It has a leading edge 32a and a trailing edge 32b. The vane 24 comprises a root 34 on one side of this aerodynamic part 32 that straightens the outlet flow from the fan, and a tip 36 on the other side.

The root 34 is used to fix the vane 24 to the hub 26 as will be described in detail below, while the tip is used to fix this vane onto the outer shell 23 prolonging the fan case 9. Furthermore, platforms are formed at the root and the tip of the vane, so as to reconstitute the fan flow 18 between the vanes 24. At the root 34, there are two platforms 40a, 40b arranged on each side of the aerodynamic part 32 of the vane, and recreating the fan flow stream 18 while being arranged so as to cover the root, in other words are arranged in the radially outwards direction relative to the vane root.

In the embodiment shown in this FIG. 2, the aerodynamic part 32 is equipped with two inner lubricant passages 50a, 50b approximately parallel to each other and parallel to the direction of the length 25. More precisely, a first lubricant passage 50a extends along a first main flow direction 52a of the lubricant. This direction 52a is approximately parallel to the length direction 25, along the direction from the root 34 towards the tip 36. Similarly, there is a second lubricant passage 50b that extends along a second main flow direction 52b of the lubricant, within this passage. This direction 52b is also approximately parallel to the length direction 25, along the opposite direction from the tip 36 towards the root 34. The outer radial ends of the two passages 50a, 50b are provided with a fluid connection passing through one or several 180° bends 54, corresponding to a hollow formed in the aerodynamic part 32, to connect one passage to the other. Nevertheless, several fluid supply-return ducts can be formed with the vane, without going outside the framework of the invention.

Alternatively, the flow directions could be inverted. It is also possible to provide two independent lubricant passages inside the vane, not connected to each other inside the vane. According to yet another possibility, the vane may be provided with a single lubricant passage, for flow in one direction or the other.

Returning to the embodiment shown in FIG. 2, note that the inner radial ends of the two passages 50a, 50b communicate with lubricant ducts 55a, 55b integrated into the hub 26 of the intermediate case. These ducts 55a, 55b, separated from each other in the axial direction, form part of a lubricant circuit shown diagrammatically by element 56 on FIG. 2. In particular, this circuit 56 comprises a pump (not shown), that imposes the required circulation direction on the lubricant through the passages 50a, 50b, namely to introduce lubricant through the inner radial end of the first passage 50a, and to extract lubricant through the inner radial end of the second passage 50b.

Thus, during operation of the turbomachine, lubricant is introduced into the first inner passage 50a through one of the two ducts 55a, along the first radially outwards direction 52a. The lubricant temperature at this stage is high. Heat exchange then takes place between this lubricant and the fan air flow 58 following the outer surface of the aerodynamic part 32 of the vane. After having been redirected by the bend 54 into the second passage 50b, it is similarly cooled in this passage, still by heat exchange with the fan flow 58, while circulating along the second main flow direction 52b. The cooled lubricant is then extracted from the vane 24, and redirected by the closed circuit 56 towards the elements to be lubricated, after passing through the other duct 55b.

Figure 4:
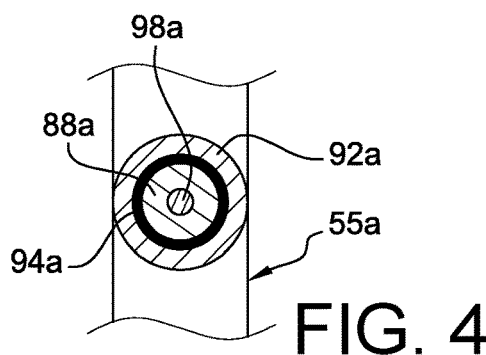
FIG. 4 represents a sectional view along line IV-IV in FIG. 3.
Figure 4A:
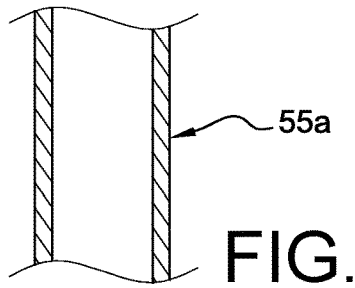
FIG. 4a represents a sectional view along line IVa-IVa in FIG. 3.

It will now be proceed to a more detailed description of the hub 26 of the intermediate case and its cooperation with the vanes 24, with reference to FIGS. 3 to 4a.

The hub 26 comprises an upstream end plate 62 and a downstream end plate 64 centred on the axis 3 and connected to each other by radial arms 66. Each end plate terminates radially outwards by a track 62a, 64a to which the outlet guide vanes 24 are fixed. In this respect, each vane comprises an upstream attachment plate 70 at its root 34 close to the leading edge 32a, in which upstream attachment holes 72 are formed, for example two holes through which screw type attachment elements 74 pass. Thus, the screws 74 pass through the upstream attachment holes 72 and screw into the threaded holes 76 of the track 62a, so as to force the plate 70 into contact with the track.

Similarly, each vane comprises a downstream attachment plate 80 at its root 34 close to the trailing edge 32b, in which downstream attachment holes 82 are formed, for example two holes through which screw type attachment elements 84 pass. Thus, the screws 84 pass through the downstream attachment holes 82 and screw into the threaded holes 86 of the track 64a, so as to force the plate 80 into contact with the track.

The plates 70, 80 are preferably made as a single piece with the aerodynamic part of the vane, and with the root 34 of which they form part.

The two lubricant ducts 55a, 55b are each routed along a circumferential direction 91 of the hub 26. Each duct extends in an annular configuration around an angular sector of approximately 360°. In this respect, note that each duct 55a, 55b can be interrupted or it can be continuous around 360°. For example, it would be possible for each duct to be made using two 180° segments, or four 90° segments. This makes it possible to form one duct for the fluid inlet, and another duct for the fluid outlet.

Each duct 55a, 55b is arranged between the two end plates 62, 64, supported on the outer radial end of the arms 66. Therefore the two ducts are practically parallel, and are connected at one of their ends to the remainder of the hydraulic circuit.

The right duct 55a on FIG. 3 corresponds to a first duct forming a lubricant distributor, while the left duct 55b corresponds to a second duct forming the lubricant collector.

Associated with the vane 24, the first duct 55a comprises a lateral opening cooperating with a first lubricant passage end-piece 88a. More precisely, the duct 55a comprises a first complementary end-piece 92a starting from its lateral opening, projecting radially outwards and into which the end-piece 88a fits. In order to make the joint leaktight, a first O-ring 94a is placed between the two end-pieces 88a, 92a, being compressed radially relative to the coincident axes of the two end-pieces. In this respect, it should be noted that a ball joint connection could be made between the two end-pieces in order to make the arrangement even more flexible. In any case, the seal between these two end-pieces enables a small swivel movement, and consequently compensation of the gap.

Figure 5:
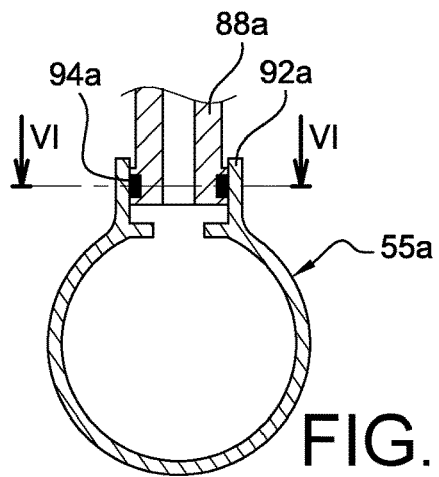
FIG. 5 represents an alternative embodiment for cooperation between a lubricant passage end-piece and a lubricant duct fixed with the hub of the intermediate case.
Figure 6:
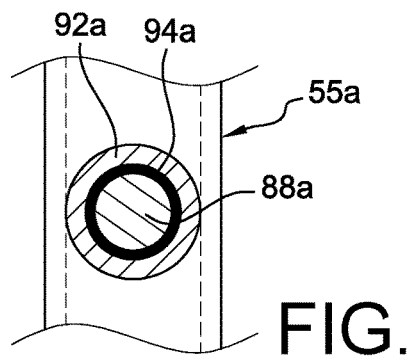
FIG. 6 represents a sectional view along line VI-VI in FIG. 5.
Figure 7:
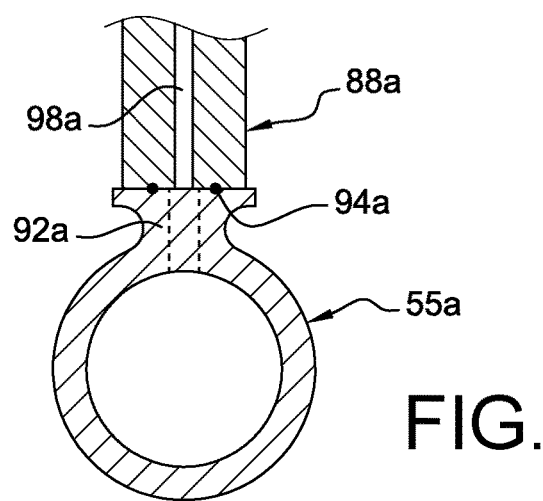
FIG. 7 is a view similar to that in FIG. 5, according to yet another alternative embodiment.

Thus, lubricant circulating in the first duct 55a can join a first lubricant passage 98a passing through the end-piece 88a, and going towards the vane 24. Note that in the embodiment in FIGS. 3 to 4a, the first duct 55a has a quadrilateral shaped cross-section 55a, but another shape could be adopted, for example an approximately circular section as shown on the embodiment in FIGS. 5 and 6. Furthermore, leak tightness between the two end-pieces 88a, 92a could be achieved using a seal that is loaded in the axial direction as in the embodiment in FIG. 7, and is no longer compressed in the radial direction.

Once again considering FIGS. 3 to 4a, note that for this embodiment, all the characteristics described above with reference to the first end-piece 88a and the first duct 55a, are used in an identical or similar manner for the second duct 55b and a second end-piece 88b cooperating with this duct 55b. On the figures, elements with the same numeric references refer to identical or similar elements, simply the extension "a" having been modified to "b" for elements associated with the second duct 55b forming the lubricant collector.

Located radially outwards from the blade root 34, one of the two platforms 40a associated with the blade 24 covers the end-piece 88a. This platform 40a, preferably made by simple machining and extending in the circumferential direction between two case vanes that are directly consecutive along the circumferential direction, is fixed on the hub 26 by conventional means. Therefore its circumferential end covers the vane root 34 and the end-piece 88a that in this case is housed in a housing orifice 132a of a circumferential projection 130a of the vane root. More precisely, the end-piece 88a is inserted radially from the outside inwards until its head stops in contact on a shoulder of the housing orifice 132a.

One of the special features of the invention lies in the fact that the first lubricant passage 98a has a first passage axis 134a, preferably oriented in the radial direction from the intermediate case axis, and that is at a circumferential spacing from a first orifice axis 140a on which a first lubricant passage orifice 124a is centred, formed in the root 34. The first orifice axis 140a is also preferably approximately radial, and its associated passage orifice 124a opens up in the first passage 50a of the aerodynamic part 32 of the vane. Nevertheless, this orifice 124a does not pass entirely through the vane root 34 because it is closed off at the radially internal end of the root, for example by a plug 136a placed after machining of the orifice.

Consequently, a first connection part 125a that in this case in elongated in shape and oriented approximately along the circumferential direction 91, is provided to enable fluid communication between the orifice 124a and the lubricant passage 98a that is approximately parallel to it. It is preferably a pin 125a housed in a housing 127a oriented in the circumferential direction and provided within the root passing through the orifice 124a and the lubricant passage 98a, preferably approximately orthogonally. A first connection conduit 142a passes through the pin 125a, the axis of the conduit 144a being approximately orthogonal to the two axes 134a, 140a. The orientation of the first connection conduit 142a appears approximately circumferential when seen in a side view.

Figure 3A:
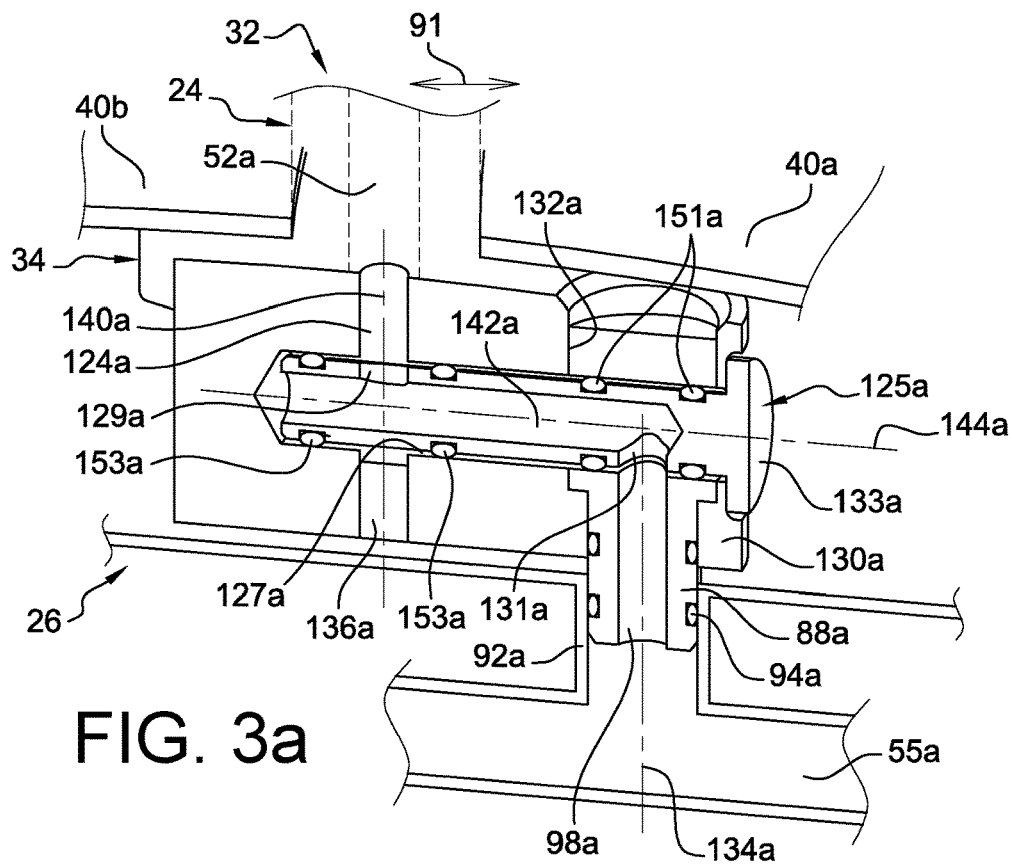
FIG. 3a represents a sectional view along line IIIa-IIIa in FIG. 3.

On FIG. 3a, the left part of the pin 125a is housed in the blade root so as to make the connection conduit 142a communicate with the orifice 124, through an opening 129a formed through the wall of the pin delimiting the connection conduit 142a. Similarly, the right part of the pin 125a is housed in the upper part of the end-piece 88a so as to make the connection conduit 142a communicate with the lubricant passage 98a, through an opening 131a formed through the wall of the pin delimiting the connection conduit 142a.

The head 133a of the first pin 125a forms a circumferential stop against the vane root 34. It is preferably fixed either to the vane root 34, or to the hub 26, or to the duct 55a, for example by one or several screws.

Two O-rings 151a make the seal between the upper part of the end-piece 88a and the pin 125a, being located on each side of the opening 131a. Similarly, two O-rings 153a make the seal between the vane root 34 and the pin 125a, being located on each side of the opening 129a.

Thus, once assembled, the pin-shaped connection part 125a performs the function of the intermediate connecting part between the vane root and the duct 55a, thus providing flexibility that facilitates assembly and disassembly, and also limits static indeterminacy in assembly of the vane. Risks of damage to end-pieces are advantageously reduced.

Note that in the embodiment that has just been described, a cylinder-cylinder type connection is adopted between the pin and the vane root and between the pin and the end-piece. These connections are thus of the pivot-slide type, but the presence of the above-mentioned O-rings 151a, 153a between these parts enables a small swivel movement, allowing even more flexibility during assembly.

Once again, it is noted that all the characteristics described above with reference to the first connection part 125*a* and its associated elements, are used identically or similarly for the second connection part 125*b* cooperating with the second end-piece 88*b* and with the duct 55*b* acting as collector. On the figures, elements with the same numeric references refer to identical or similar elements, simply the extension "a" having been modified to "b" for elements associated with the second connection piece 125*b*.

Figure 8:
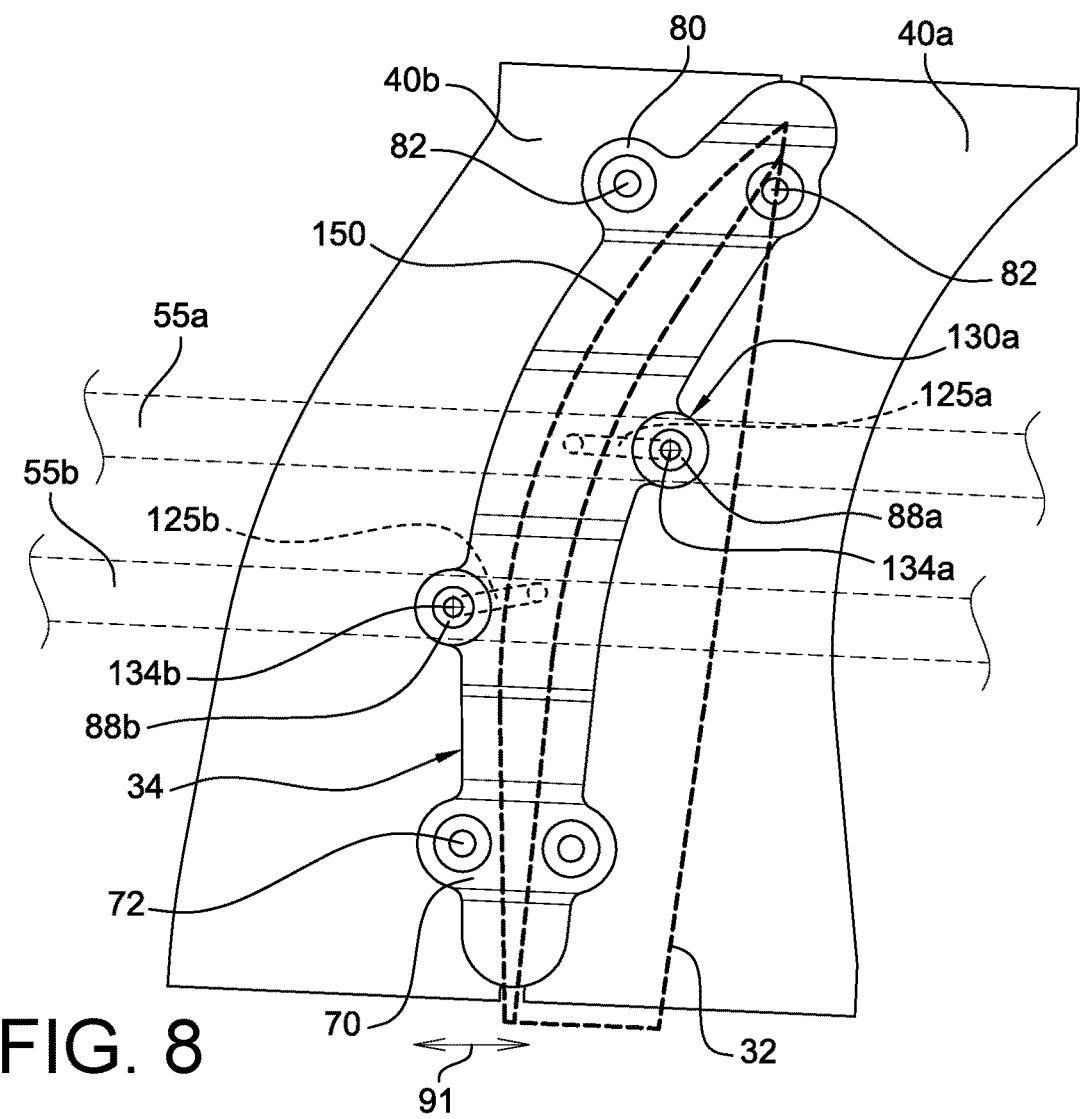
FIG. 8 represents a simplified bottom view of the view in FIG. 3.

As can be seen particularly on FIG. 8, the two end-pieces 88*a*, 88*b* are at a spacing from each other in the axial direction, and both are placed in the axial direction between the upstream 72 and downstream 82 attachment holes of the vane 24. In the circumferential direction, each passage axis 134*a*, 134*b* is at a spacing from a connection zone 150 between the vane 34 and the aerodynamic part 32, the profile of which is shown diagrammatically by the dashed lines in FIG. 8. Also with reference to FIG. 8, note that the two end-pieces 88*a*, 88*b* could be located on the same side of the aerodynamic part, but they are preferably located on opposite sides of this part 34 to further facilitate integration. Thus, the first end-piece 88*a* and its associated pin 125*a* are located on the intrados side, and the second end-piece 88*b* and its associated pin 125*b* are located on the extrados side, or vice versa.

Figure 9:
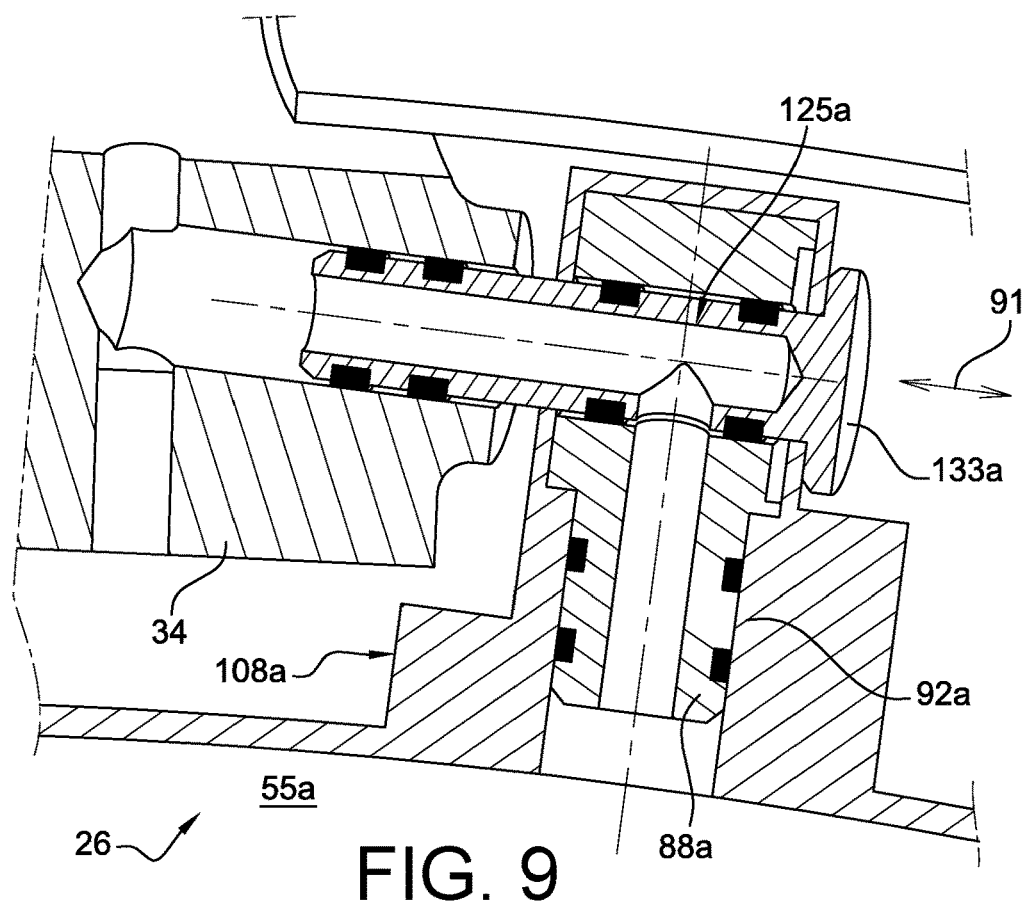
FIG. 9 is a view similar to that in FIG. 3a, according to an alternative embodiment.

With reference to an alternative embodiment shown on FIG. 9, the end-piece 88*a* is no longer housed in an orifice in the vane root, but is offset from it along the circumferential direction 91. The end-piece 88*a* is then retained simply by cooperation with the pin 125*a* and the complementary end-piece 121*a*, either by an end-piece support device 108 fixed to one or the other duct or to both ducts, or directly on the hub 26.

Figure 10:
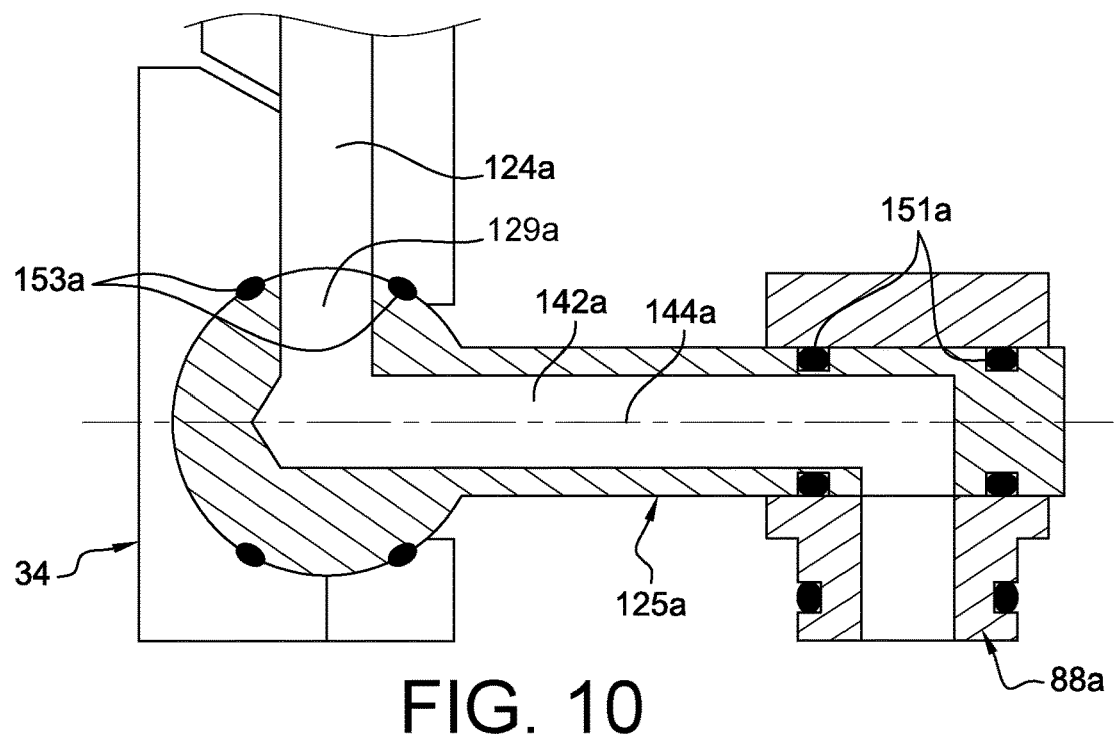
FIG. 10 is a view similar to that in FIG. 3a, according to yet another alternative embodiment.

According to yet another alternative shown on FIG. 10, a ball joint connection is provided at the junction between the vane root 34 and the pin 125*a*, making the assembly even more flexible. This type of connection can be provided by providing an add-on vane root recomposition part, to close the cage forming the ball joint. One of the other advantages of this type of connection lies in the fact that it can hold the pin 125*a* in position. In this respect, note that a similar connection can also be provided between the end-piece 88*a* and the pin 125*a*.

FIG. 11 represents another embodiment, in which the end-piece support 108*a* is associated with two end-pieces 88*a*, 88*b*, the first cooperating with the duct 55*a* to distribute lubricant in a vane 24, and the second cooperating the duct 55*b* for collection of lubricant in a directly consecutive vane 24 along the circumferential direction. In this case, the two end-pieces 88*a*, 88*b* are at an axial spacing from each other, the end-piece 108*a* that is common to the two is arranged circumferentially between the two vanes 24, and radially between the lubricant ducts 55*a*, 55*b* and the platform 40*a*.

The end-piece support device 108*a* is preferably made in two distinct parts, namely a first main body 160 fixed for example by screws on the pipes 55*a*, 55*b* or the hub, and a closing cover 162 fixed by screws on the main body 160. A first housing 164*a* in which the first pin 125*a* is located, and a second housing 164*b* in which the second pin 125*b* is located, are defined between the main body 160 and the closing cover 162.

Furthermore, each end-piece 88*a*, 88*b* is preferably supported by the main body using a connection that is preferably a screwed connection, but that could be a flanged, welded or similar connection. A fabrication in which each end-piece is made as a single piece with the main body 160 can also be envisaged without going outside the framework of the invention. Nevertheless, one of the advantages of having a removable/reversible connection between each end-piece and the main body 160 lies in the ease of removing the end-piece, and possibly being able to place a plug on this main body so as to isolate the vane concerned from the rest of the lubricant circuit.

Finally, as can be seen for the first pin 125*a*, this pin is fitted with an attachment lug 166*a* at its head 133*a* that can be used to fasten it with a screw onto a complementary attachment lug 168*a* fixed to the complementary end-piece 92*a* fitted on the first duct 55*a*. A similar attachment is made for the second pin 125*b*.

FIGS. 12*a* to 12*f* represent different steps in a method of assembling the intermediate case shown on FIG. 11.

Figure 12A:
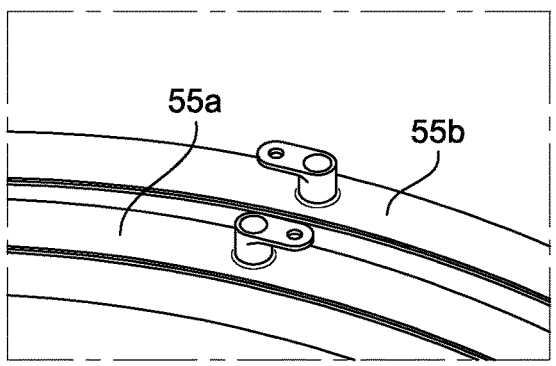
FIGS. 12a to 12f represent different steps in a method of assembling the case shown on FIG. 11.
Figure 12B:
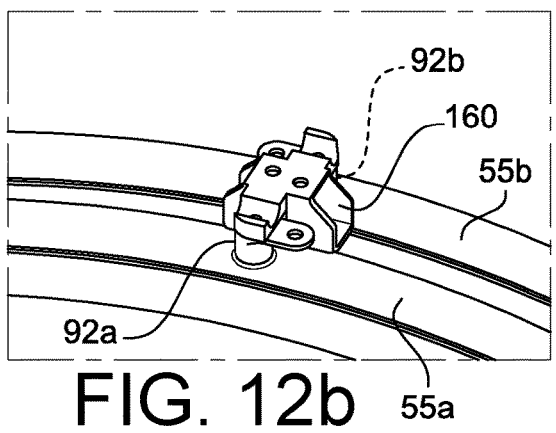
Figure 12C:
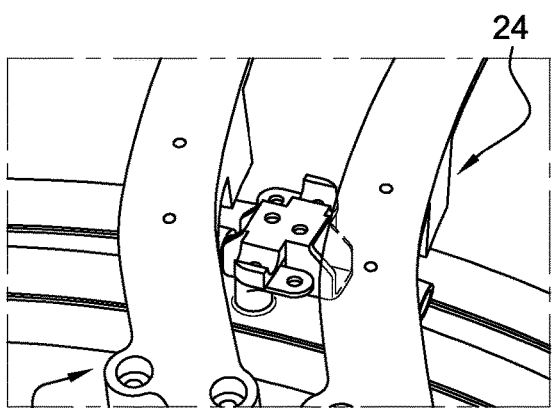
Figure 12D:
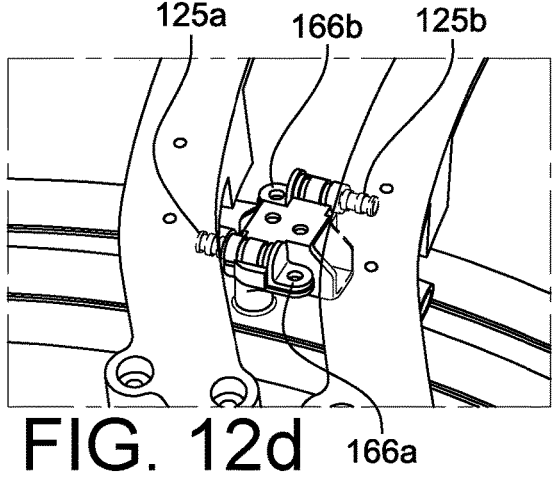
Figure 12E:
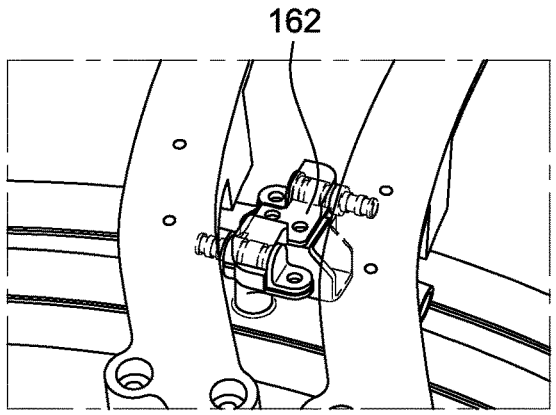
Figure 12F:
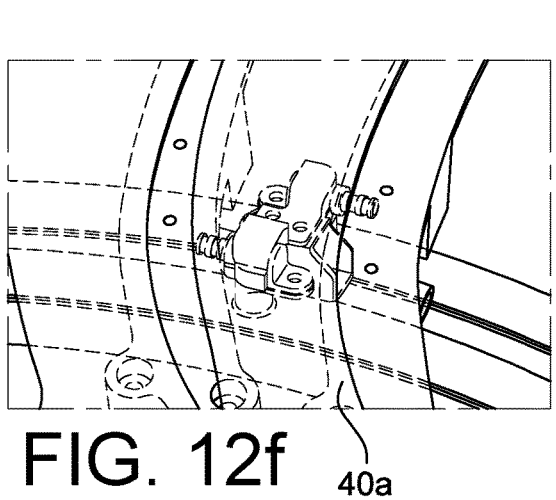

Firstly, the hub is fitted with its ducts 55*a*, 55*b*, as shown diagrammatically on FIG. 12*a*. Then, with reference to FIG. 12*b*, the main body 160 of the common end-piece support is fixed on the ducts, such that each end-piece penetrates into its complementary end-piece 92*a*, 92*b*. The two directly consecutive vanes 24 are then placed and fixed on the hub as shown on FIG. 12*c*, and the two pins 125*a*, 125*b* are then placed on the main body 160. This step is shown on FIG. 12*d*, and in this step the pins are also inserted into their associated vane root and then fixed by their lugs 166*a*, 166*b*. The next step, shown diagrammatically on FIG. 12*e*, consists of fixing the cover 162 on the main body, before the platform 40*a* covers the assembly as shown on FIG. 12*f*. These steps are repeated for all directly consecutive vane pairs of the case that include a heat exchanger function.

Obviously, an expert in the subject can make various modifications to the invention as it has just been described solely through non-limitative examples. In particular, the technical characteristics specific to each embodiment described above can be combined together without going outside the scope of the invention.

The invention claimed is:

1. An intermediate case for a twin spool turbomachine for an aircraft, comprising a hub, an outer shell and outlet guide vanes installed at their ends on the hub and on the outer shell, and each of at least some of said outlet guide vanes performing a heat exchanger function and comprising a lubricant passage designed to be cooled by a fan flow following an outer surface of the outlet guide vanes, a root of the outlet guide vanes comprising at least one lubricant passage orifice extending along an orifice axis and communicating with a lubricant duct fixed to the hub, wherein the intermediate case also comprises at least one lubricant passage end-piece associated with at least one of the outlet guide vanes, comprising a lubricant passage extending along a passage axis and opening up in the lubricant duct, and in that the passage axis and the orifice axis are at a spacing from each other along a circumferential direction of the intermediate case, and in that a connection piece through which a connection conduit passes is firstly partially housed in the vane root so as to create a communication between the connection conduit and the vane root lubricant passage orifice, and secondly, the connection piece is partially housed in an end-piece support device or in the lubricant passage end-piece, such that the connection conduit communicates with the lubricant passage in the end-piece support device.

2. The intermediate case according to claim 1, wherein said connection piece has an elongated shape, oriented generally along the circumferential direction of the intermediate case.

3. The intermediate case according to claim 1, wherein said connection piece is fixed to the vane root or onto the hub of the intermediate case, or onto the lubrication duct, the complementary end-piece support device cooperating with the lubricant passage end-piece.

4. The intermediate case according to claim 3, wherein said connection piece is fixed onto a lug of a complementary end-piece support device provided on the lubricant duct.

5. The intermediate case according to claim 1, wherein the passage axis and the orifice axis are parallel to each other, and are orthogonal to a conduit axis of said connection conduit.

6. The intermediate case according to claim 1, wherein the end-piece support device comprises a main body fixed on the lubricant duct and a cover fixed on the main body, and in that the connection piece is housed in a housing formed jointly by the main body and the cover.

7. The intermediate case according to claim 6, wherein the main body and the lubricant passage end-piece are formed as a single piece, or are fixed to each other by a welded or screwed connection.

8. The intermediate case according to claim 1, further comprising at least one bypass flow path reformation platform associated with said outlet guide vanes, said platform being fixed to the hub and arranged along a radially outwards direction from the vane root and the end-piece support device.

9. The intermediate case according to claim 1, wherein the end-piece support device is arranged between two directly consecutive outlet guide vanes of said intermediate case, the end-piece support device comprising a first and a second lubricant passage end-piece, the two end-pieces:
- being associated with two directly consecutive outlet guide vanes through a first and a second connection piece respectively; and
- cooperating with a first and a second lubricant duct respectively.

10. A twin spool turbomachine for an aircraft, comprising the intermediate case according to claim 1, located downstream from a fan of this turbomachine.

11. Method for assembly of the intermediate case according to claim 6, comprising the following steps:
- assembly of the main body of the end-piece support device on the duct, such that each lubricant passage end-piece cooperates with its associated duct;
- placement of the connection piece on the main body and in the vane root, then attachment of the connection part onto its associated duct; and
- attachment of the cover on the main body so as to squeeze the connection piece between the main body and the cover of the end-piece support device.

* * * * *